United States Patent [19]

Teramachi

[11] Patent Number: 4,586,758

[45] Date of Patent: May 6, 1986

[54] BEARING UNIT

[76] Inventor: Hiroshi Teramachi, 3-6-4, Kamiosaki, Sinagawa-Ku, Tokyo, Japan

[21] Appl. No.: 712,086

[22] Filed: Mar. 15, 1985

[30] Foreign Application Priority Data

Mar. 19, 1984 [JP] Japan .................................. 59-51091

[51] Int. Cl.$^4$ ............................................. F16C 29/04
[52] U.S. Cl. .................................... 308/6 C; 308/6 R
[58] Field of Search ................................ 308/6 C, 6 R

[56] References Cited

U.S. PATENT DOCUMENTS

| 2,230,442 | 2/1941 | Arms ..................................... | 308/6 C |
| 4,030,191 | 6/1977 | Ernst et al. .......................... | 308/6 C |
| 4,302,059 | 11/1981 | Teramachi .......................... | 308/6 C |
| 4,420,193 | 12/1983 | Teramachi .......................... | 308/6 C |
| 4,420,194 | 12/1983 | Asami ................................. | 308/6 C |
| 4,428,627 | 1/1984 | Teramachi .......................... | 308/6 C |

Primary Examiner—John M. Jillions
Assistant Examiner—Thomas R. Hannon
Attorney, Agent, or Firm—Kenyon & Kenyon

[57] ABSTRACT

A bearing unit includes a bearing body, a track rail and rolling elements. The bearing body is slid along the track rail through the rolling elements. A non-loaded rolling element rolling groove is formed on the bearing body in the longitudinal direction thereof by cutting a portion of the bearing body. The non-loaded rolling element rolling groove is covered with a cover, thereby forming a non-loaded rolling element rolling passage for recirculating the rolling elements which roll through the area between the bearing body and the track rail. A retainer may be provided between the bearing body and the track rail. The retainer has a guide surface for guiding the rolling elements rolling through the area between the bearing body and the track rail and preventing the dislocation of the rolling elements.

6 Claims, 26 Drawing Figures

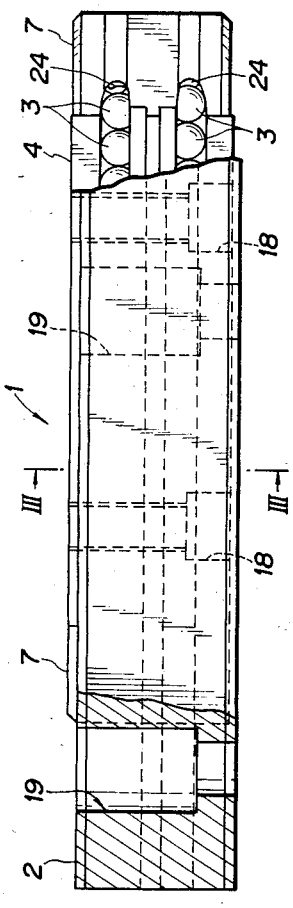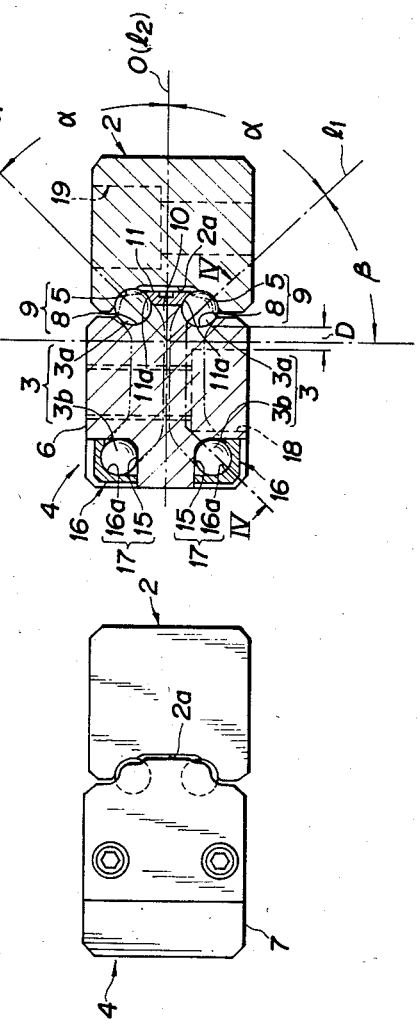

BEARING UNIT

BACKGROUND OF THE INVENTION

1. Field of the Invention

The present invention relates to a bearing unit for use in a table saddle of a machine tool or a sliding part of a machining center or a transfer system.

2. Description of the Prior Art

A typical conventional bearing unit has heretofore been arranged as shown in FIG. 26. More specifically, a track rail 101 of continuous length is provided on one of its sides with a ridge 101a which extends in the longitudinal direction thereof. On both sides of the ridge 101a are formed two ball-rolling surfaces 102 which extend in the longitudinal direction of the track rail 101. On the other hand, a bearing body 103, which slides along the track rail 101 in the longitudinal direction thereof, is provided on one of its side surfaces with a recess 103a extending in the longitudinal direction of the bearing body 103 while facing the ridge 101a on the track rail 101. On both sides of the recess 103a are formed two ball-rolling surfaces 104, 104 which respectively face the ball-rolling surfaces 102, 102 formed on both sides of the ridge 101a on the track rail 101. Further, a multiplicity of balls 105, 105 . . . are interposed between the opposing ball-rolling surfaces 102, 102 and 104, 104, whereby the bearing body 103 is lightly slid along the track rail 101 by virtue of the rolling of these balls 105, 105 . . . . In addition, in order to recirculate the balls 105, 105 . . . , the bearing body 103, which is solid, has two non-loaded ball rolling bores 107, 107 extending therethrough, the non-loaded ball rolling bores 107, 107 being continuous with two loaded ball rolling passages 106, 106 which are respectively constituted by the opposing ball-rolling surfaces 102, 102 and 104, 104, whereby two endless ball recirculating passages are respectively constituted by the loaded ball rolling passages 106, 106 and the non-loaded ball rolling bores 107, 107 which correspond to each other. Moreover, the balls 105, 105 . . . within the loaded ball rolling passages 106, 106 are guided by a retainer 109 which is formed with slits 108, 108 extending in the longitudinal direction thereof in such a manner that the balls 105, 105 . . . properly roll within the loaded ball rolling passages 106, 106, and furthermore are prevented from coming off.

In this type of conventional bearing unit, the non-loaded ball rolling bores 107, 107 are longitudinally formed in the solid bearing body 103 by means of, for example, a drill. For this reason, as the length of the bearing body 103 increases, it becomes difficult to effect accurate boring due to, for example, the deflection of the drill. Further, when boring is effected from both end surfaces of the bearing body 103 in such a manner that the bores being cut from both end surfaces join together at an intermediate portion inside the bearing body 103 to thereby form one through-bore, an undesirable step is easily formed at the intermediate portion where they join. In order to eliminate such a step, it is inconveniently necessary to conduct such a correcting operation as forming a larger bore again or reaming. Accordingly, much time and labor are required to carry out the boring operation, which fact constitutes a factor in the increase of costs.

Further, since the length of the bearing body 103 is thus limited, the length of each of the loaded ball rolling passages 106, 106 is inevitably limited also. It is, therefore, extremely difficult to increase the length of each of the loaded ball rolling passages 106, 106 for the purpose of increasing the rated load-bearing capacity of the bearing beyond a predetermined limit.

Moreover, if the length of each of the ball-rolling surfaces 104, 104 on the bearing body 103 is changed for the purpose of changing the rated load-bearing capacity of the bearing, it is necessary to change the length of the retainer 109 correspondingly. In such a case, it is further necessary to change the length of each of the slits 108, 108 of the retainer 109 and the position of a ball-guiding tongue (not shown) which projects from each of the ends of each slit 108. For this reason, it is necessary to change the arrangement of the retainer 109 in accordance with a change in the rated load-bearing capacity of the bearing so that the retainer 109 possesses slits of proper length and tongues located at proper positions, which fact also leads to an increase in cost.

In the conventional bearing unit, further, the ball-rolling surfaces 104, 104 are formed on both sides of the recess 103a of the bearing body 103, which involves a narrow distance d between the ball-rolling surfaces 104, 104 and bolt receiving bores 110 formed in the bearing body 103. As a result, when the ball-rolling surfaces 104, 104 are hardened by, for example, high-frequency (induction) hardening for the purpose of increasing wear resistance, the thin-walled portion between the ball-rolling surfaces 104, 104 and the bolt receiving bores 110 may disadvantageously melt on heating at high temperature. For this reason, it is not possible to reduce the distance d between the bolt receiving bores 110 and the ball-rolling surfaces 104, 104 by a large margin. Accordingly, the reduction in the size and weight of the bearing body 103 and, hence, of the bearing unit as a whole is greatly limited.

In addition, the ball-rolling surfaces 102, 102 of the track rail 101 are formed on both sides of the ridge 101a in such a manner that the ball-rolling surfaces 102, 102 extend horizontally. For this reason, dust or other foreign matter in the air may adhere to the ball-rolling surfaces 102, 102, resulting disadvantageously in a possible interference with the smooth sliding of the bearing body 103 in relation to the track rail 101.

SUMMARY OF THE INVENTION

In view of the above-described problems of the prior art, it is a primary object of the present invention to provide a bearing unit in which a bearing body is formed with a non-loaded rolling element rolling groove in its longitudinal direction by cutting a portion thereof, and a cover is provided in such a manner as to cover the non-loaded rolling element rolling groove, thereby forming a non-loaded rolling element rolling passage, whereby the need to conduct the troublesome and time consuming operation of forming a non-loaded rolling element rolling bore is eliminated, thereby improving the operating efficiency and consequently reducing the cost, and whereby it is possible to increase as desired the length of the bearing body, that is, the length of a loaded rolling element rolling surface formed thereon, thereby allowing the load-bearing capacity of the bearing as a whole to be increased as desired.

To this end, according to the present invention, a non-loaded rolling element rolling passage provided on a bearing body is constituted by a non-loaded rolling element rolling groove and a cover, the rolling groove being formed on one of the side surfaces of the bearing body in its longitudinal direction, and the cover being provided in such a manner as to cover the non-loaded rolling element rolling groove in the longitudinal direction of the bearing body.

The above and other objects, features and advantages of the present invention will become clear from the following description of the preferred embodiment thereof, taken in conjunction with the accompanying drawings.

BRIEF DESCRIPTION OF THE DRAWINGS

FIGS. 1 to 23 in combination show one embodiment of the bearing unit according to the present invention, in which:

FIG. 1 is a side elevational view of the bearing unit, with its track rail partly cut away;

FIG. 2 is a front elevational view of the bearing unit shown in FIG. 1;

FIG. 3 is a sectional view taken along the line III—III of FIG. 1;

FIG. 4 is a sectional view taken along the line IV—IV of FIG. 3;

FIG. 5 is a plan view of a bearing body employed in the bearing unit;

FIG. 6 is a bottom view of the bearing body;

FIG. 7 is a front elevational view of a bearing block constituting the bearing body;

FIG. 8 is a plan view of the bearing block;

FIG. 9 is a side elevational view of the bearing block;

FIG. 10 is a front elevational view of a cover employed in the bearing unit;

FIG. 11 is a side elevational view of the cover;

FIG. 12 is a front elevational view of a retainer employed in the bearing unit;

FIG. 13 is a side elevational view of the retainer;

FIG. 14 is a front elevational view of an end plate body constituting an end plate employed in the bearing unit;

FIG. 15 is a side elevational view of the end plate body as viewed from the right-hand side thereof;

FIG. 16 is a rear view of the end plate body;

FIG. 17 is a side elevational view of the end plate body as viewed from the left-hand side thereof;

FIG. 18 is a sectional view taken along the line XVIII—XVIII of FIG. 14;

FIG. 19 is a plan view of the end plate body;

FIG. 20 is a side elevational view of an internal member constituting the end plate;

FIG. 21 is a front elevational view of the internal member;

FIG. 22 is a sectional view taken along the line XXII—XXII of FIG. 21; and

FIG. 23 is a rear view of the internal member;

FIGS. 24 and 25 in combination show a linear slide table unit incorporating the bearing unit according to the present invention, in which:

FIG. 24 is a sectional view taken along the line XXIV—XXIV of FIG. 25; and

FIG. 25 is a plan view of the linear slide table unit; and

DESCRIPTION OF THE PREFERRED EMBODIMENT

Figure 4:
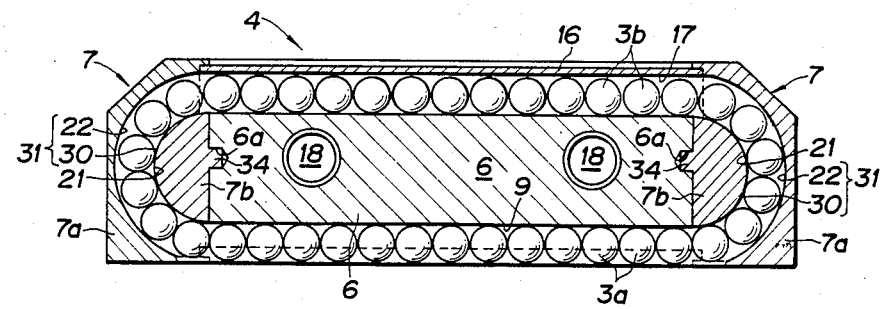

The present invention will be described hereinunder with reference to the accompanying drawings.

Referring first to FIGS. 1 to 23 which in combination show one embodiment in which the invention is applied to an endless slide ball bearing, the arrangement of the embodiment will be explained hereinunder. As shown in FIGS. 1 to 3, an endless slide ball bearing unit 1 as a bearing unit is constituted by a track rail 2 of continuous length and a bearing body 4 which slides along the track rail 2 in the longitudinal direction thereof with a multiplicity of steel balls 3,;3 . . . , serving as rolling elements. The track rail 2 is provided on one side surface thereof with a recess 2a of substantially trapezoidal cross-section extending in the longitudinal direction of the track rail 2. On both sides of the recess 2a are formed two first loaded ball rolling surfaces 5, 5 serving as first loaded rolling element rolling surfaces, each of which has a radius of curvature substantially equal to that of the balls 3, 3 . . . . Each of the first loaded ball rolling surfaces 5, 5 is subjected to a surface hardening treatment, such as high-frequency (induction) hardening over the whole area of the surface. The first loaded ball rolling surfaces 5, 5 are, as shown in FIG. 3, slanted diagonally downward and upward, respectively, with respect to the central line 0 of the recess 2a.

Figure 5:
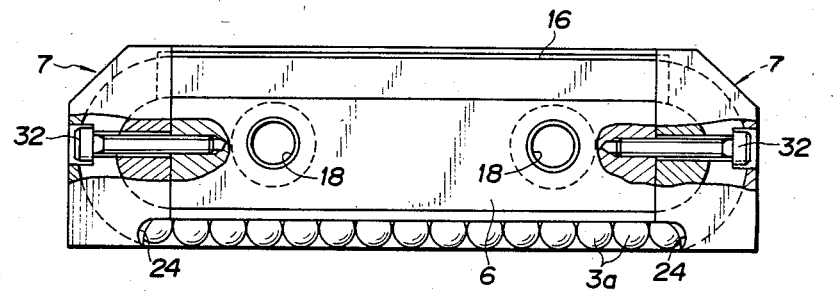
Figure 6:
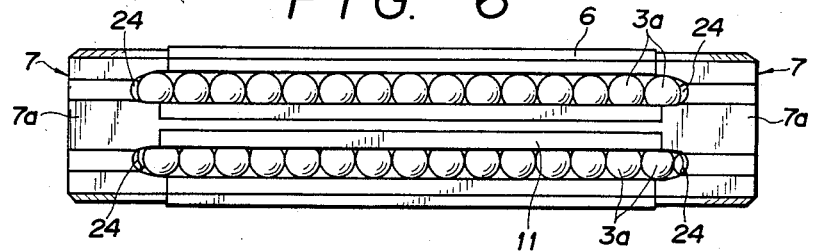

On the other hand, the bearing body 4 is, as shown in FIGS. 4 to 6, mainly constituted by a bearing block 6 of a substantially rectangular parallelepiped shape and end plates 7 which are respectively attached to both end surfaces of the bearing block 6. The arrangement of these members will now be explained.

Figure 7:
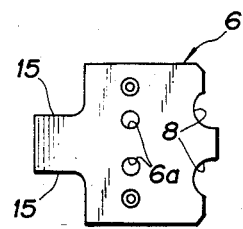
Figure 8:
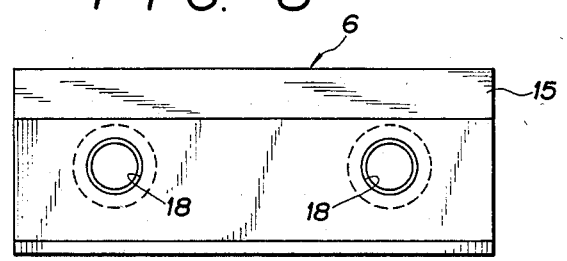
Figure 9:
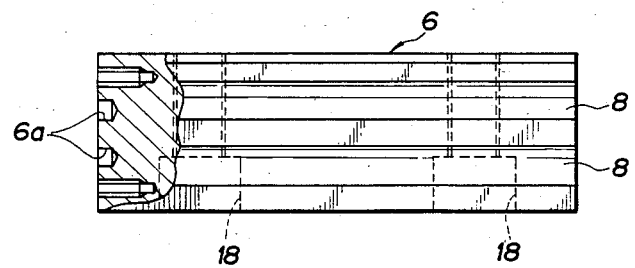
Figure 10:
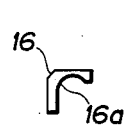
Figure 11:
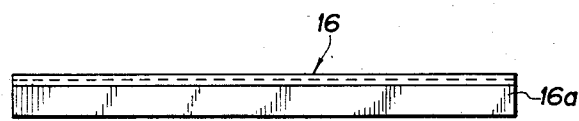
Figure 12:
Figure 13:
Figures 14, 15:
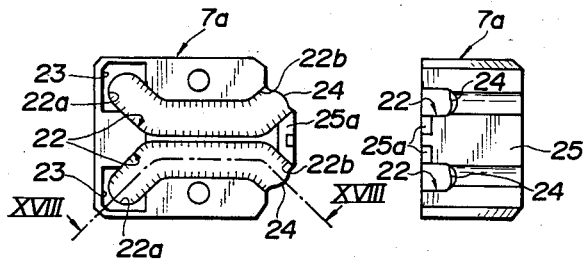
Figures 16, 17:
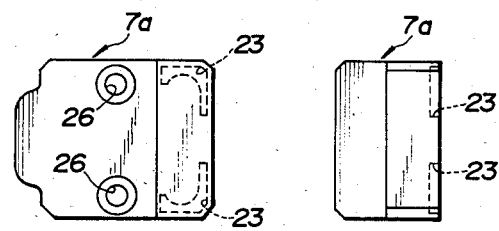
Figures 18, 19:
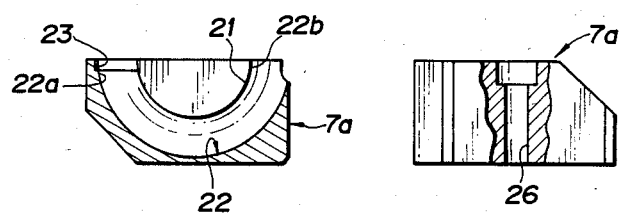
Figures 20, 21:
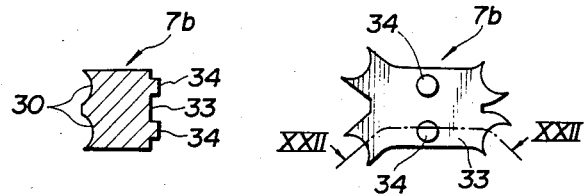
Figure 22:
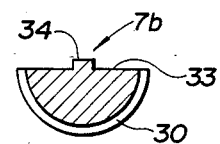
Figure 23:
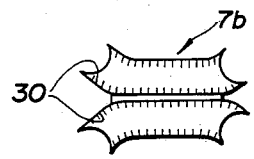

The bearing block 6 has a substantially rectangular cross-section as shown in FIGS. 7 to 9. The bearing block 6 has two second loaded ball rolling surfaces 8, 8 of a circular cross-section formed on one of its side surfaces opposing the track rail 2 in such a manner that they extend in parallel in the longitudinal direction of the bearing block 6, the second loaded ball rolling surfaces 8, 8 serving as second loaded rolling element rolling surfaces and having a radius of curvature which is substantially equal to that of the balls 3, 3 . . . . These second loaded ball rolling surfaces 8, 8 are subjected to a surface hardening treatment, such as high-frequency (induction) hardening. As will be clear from FIG. 7, the second loaded ball rolling surfaces 8, 8 are directed in the diagonally upward and downward directions, respectively, whereby they cooperate with the first loaded ball rolling surfaces 5, 5 in constituting two loaded ball rolling passages 9, 9 (see FIG. 3) serving as loaded rolling element rolling passages, the first loaded ball rolling surfaces 5, 5 being formed on the track rail 2 in such a manner as to point in the diagonally downward and upward directions, respectively, as described above. Thus, the angle of contact between the balls 3, 3 . . . and the corresponding first and second loaded ball rolling surfaces 5, 5 and 8, 8 is set at about 45 degrees (the angle of contact is each of the angles $\alpha$ and $\beta$ which are respectively made between the imaginary line $l_1$ connecting together the points of contact between one ball and the corresponding first and second loaded ball rolling surfaces and the lines $l_2$, $l_3$ of the action of force applied by the load). In this case, the line $l_a$ of action of force is coincident with the central line 0 of the recess 2a, while the line $l_3$ of action of force is vertical to the central line 0.

Further, as shown in FIGS. 3 to 6, the bearing block 6 has a ridge 10 which is formed thereon between the second loaded ball rolling surfaces 8, 8 in such a manner as to extend in the longitudinal direction of the bearing block 6. On the ridge 10 is longitudinally provided a retainer 11 (see FIGS. 12 and 13) having ball guide surfaces 11a, 11a of a circular cross-section which are respectively connected to the second loaded ball rolling surfaces 8, 8. The arrangement is such that the ball guide surfaces 11a, 11a of the retainer 11 cooperate with the side edge portions of the second loaded ball rolling surfaces 8, 8 in preventing the dislocation of the balls 3, 3 which are disposed on the second loaded ball rolling surfaces 8, 8.

On the other hand, two non-loaded ball rolling grooves 15, 15 of a rectangualr cross-section are longitudinally formed on the opposite side of the bearing block 6 by cutting the upper and lower corner portions of the bearing block 6 in the manner shown in FIGS. 7 and 8. These non-loaded ball rolling grooves 15, 15 are, as shown in FIGS. 3 to 6, respectively covered with covers 16, 16 (see FIGS. 10 and 11) in the longitudinal direction of the bearing block 6, each of the covers 16, 16 having a substantially L-shaped cross-section and being provided on its inner side with a ball guide surface 16a. Thus, two non-loaded ball rolling passages 17, 17 are respectively constituted by the ball guide surfaces 16a, 16a of the covers 16, 16 and the non-loaded ball rolling grooves 15, 15 of the bearing block 6.

It is to be noted that the reference numeral 18 in the Figures denotes each of the mounting bores which are formed in the bearing block 6 for the purpose of mounting the bearing body 4 on, for example, a movable table by means of, for example, bolts, and the numeral 19 represents each of the mounting bores which are formed in the track rail 2 in the longitudinal direction thereof at proper spacings for the purpose of mounting the track rail 19 on, for example, a fixed bed.

Each of the end plates 7, which are attached to both end surfaces of the bearing block 6, are, as will be clear from FIG. 4, constituted by an end plate body 7a and an internal member 7b which is fitted inside the end plate body 7a. As shown in FIGS. 14 to 19, the end plate body 7a has a substantially rectangular cross-section similar to that of the bearing block 6. The end plate body 7a has on its inner side a fitting groove 21 (see FIG. 18) for fitting the internal member 7b, the groove 21 being semicircular in plan view. On the outer periphery of the fitting groove 21 are formed two communicating grooves 22, 22 (see FIGS. 14 and 18) which are substantially semi-annular in plan view and have a circular cross-section. Both ends of the communicating grooves 22, 22 are respectively connected to the loaded ball rolling passages 9, 9 and the non-loaded ball rolling passages 17, 17. Further, as will be clear from FIGS. 14 and 16 to 18, the end plate body 7a has two retainer grooves 23, 23 formed in the upper and lower corner portions thereof at the respective end portions 22a, 22a of the communicating grooves 22, 22 at which they are respectively connected to the non-loaded ball rolling passages 17, 17, the retainer grooves 23, 23 having an L-shaped cross-section similar to that of the covers 16, 16. Thus, when the end plate body 7a is attached to each of the end surfaces of the bearing block 6, both end portions of each cover 16 are fitted into the corresponding L-shaped retainer grooves 23, 23 of the end plate bodies 7a, 7a in such a manner that they are retained thereby. Tongues 24, 24 are provided at the respective end portions 22b, 22b of the communicating grooves 22, 22 at which they are respectively connected to the loaded ball rolling passages 9, 9. The tongues 24, 24 serve to guide the balls 3, 3 . . . rolling through the loaded ball rolling passages 9, 9 into the respective communicating grooves 22, 22. Further, the end plate body 7a has a ridge 25 formed on its inner side. Retainer accommodating grooves 25a having a cross-sectional configuration similar to that of the retainer 11 are formed at a portion of the ridge 25 between the end portions 22b, 22b on the side of the communicating grooves 22, 22 on which they have their respective tongues 24, 24. Thus, when the end plate body 7a is attached to each of the end surfaces of the bearing block 6, both end portions of the retainer 11 are fitted into the retainer accommodating grooves 25a, 25a in such a manner that they are retained thereby.

The reference numeral 26 denotes each of the bolt receiving bores employed to mount the end plate body 7a on the bearing block 6.

Referring now to FIGS. 20 to 23, the internal member 7b, which is fitted into the fitting groove 21 on the inner surface of the end plate body 7a, is substantially semicircular in plan view (see FIG. 22) and has, as a whole, the same external configuration as that of the fitting groove 21. On the outer peripheral surface of the internal member 7b are formed two communicating grooves 30, 30 which correspond to the communicating grooves 22, 22 on the outer periphery of the fitting groove 21, the communicating grooves 30, 30 being semi-annular in plan view and having a circular cross-section. Thus, when the internal member 7b is fitted into the fitting groove 21 of the end plate body 7a, two semi-annular communicating passages 31, 31 are constituted by cooperation between the communicating grooves 22, 22 and 30, 30 which correspond to each other. In consequence, when the end plates 7, 7 are mounted on both end surfaces of the bearing block 6 by means of bolts 32, 32, as will be clear from FIG. 4, the loaded and non-loaded ball rolling passages 9, 9 and 17, 17 which correspond to each other are respectively communicated with each other by the communicating passages 31, 31, and thus two endless ball recirculating passages are constituted thereby.

Further, a pair of positioning projections 34, 34 are provided on the flat inner surface 33 of the internal member 7b in such a manner as to be spaced in the vertical direction. Thus, when the end plate 7 is attached to the bearing block 6, the positioning projections 34, 34 are fitted into positioning holes 6a, 6a formed in each of the end surfaces of the bearing block 6, whereby the end plate 7 and the bearing block 6 are properly positioned.

The balls 3, 3 . . . , which are interposed between the track rail 2 and the bearing body 4 in such a manner as to recirculate, include loaded balls 3a, 3a . . . and non-loaded balls 3b, 3b . . . as shown in FIGS. 3 and 4. The loaded balls 3a, 3a . . . roll within the loaded ball rolling passages 9, 9 defined between the track rail 2 and the bearing body 4 in such a manner that the balls 3a, 3a . . . are loaded, while the non-loaded balls 3b, 3b . . . roll within the non-loaded ball rolling passages 17, 17 respectively defined between the non-loaded ball rolling grooves 15, 15 of the bearing block 6 and the covers 16, 16. It is to be noted that the identical balls 3, 3 . . . are referred to as the "loaded balls 3a, 3a . . . " when they are rolling within the loaded region and are referred to as the "non-loaded balls 3b, 3b . . . " when they are within the non-loaded region.

Figure 24:
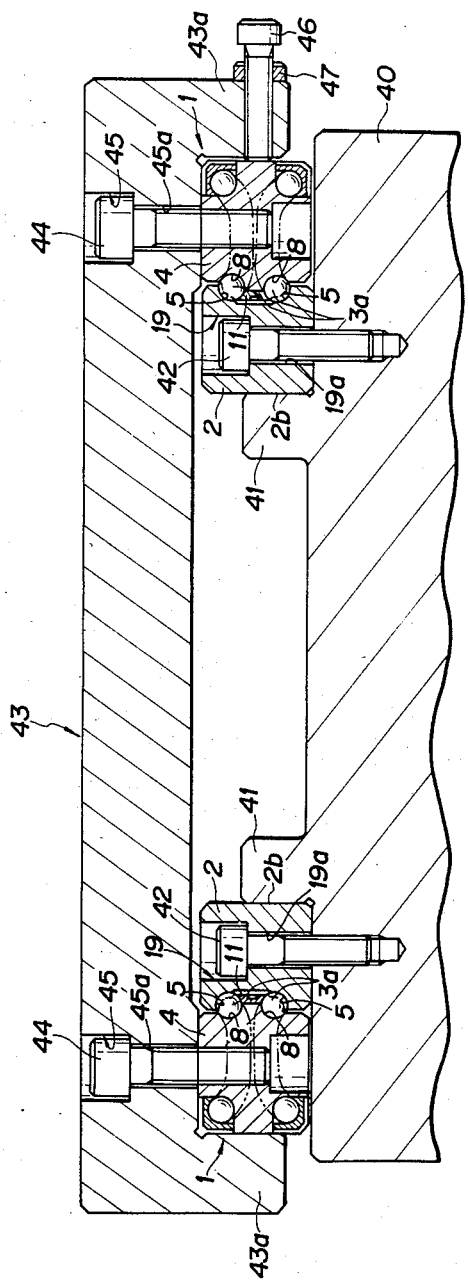
Figure 25:
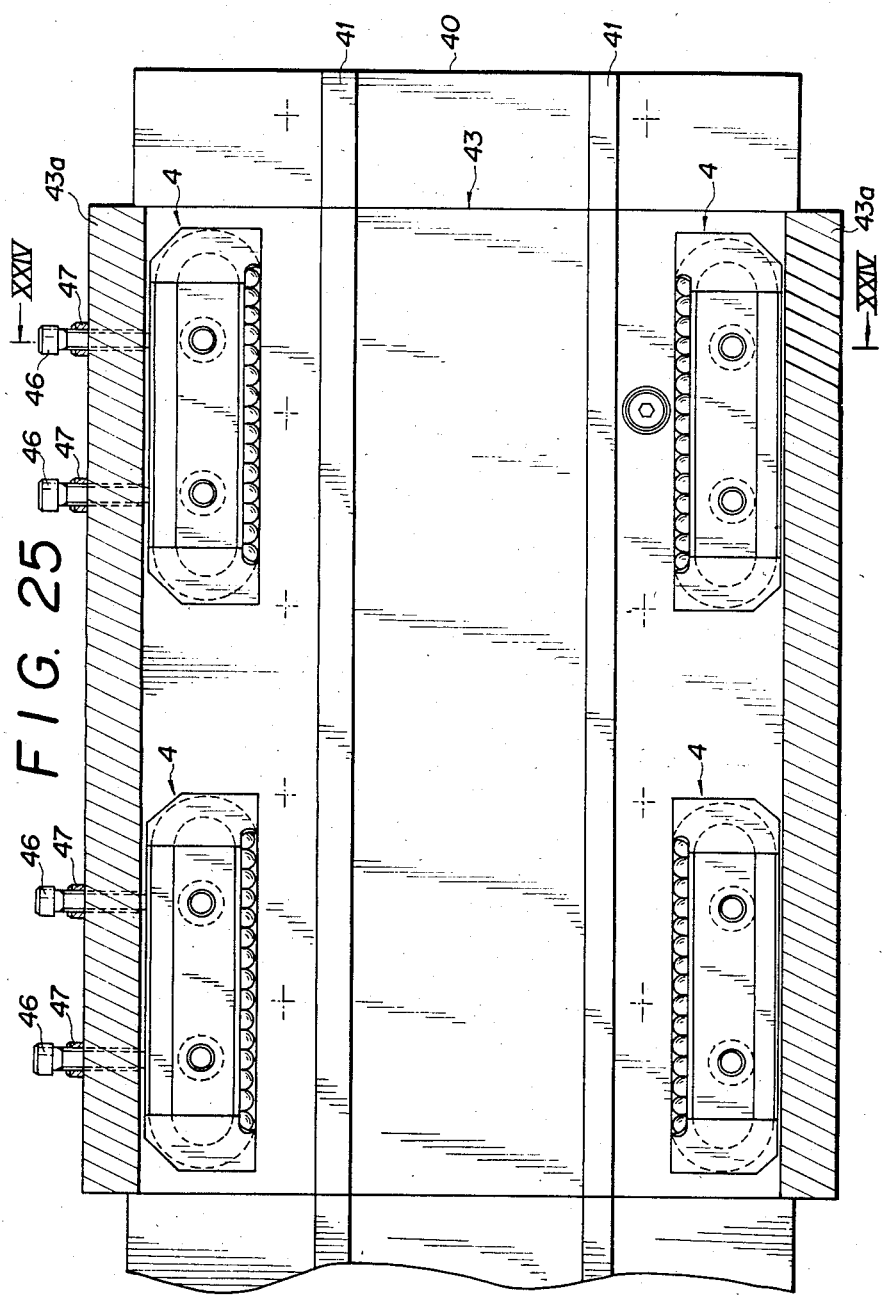
Figure 26:
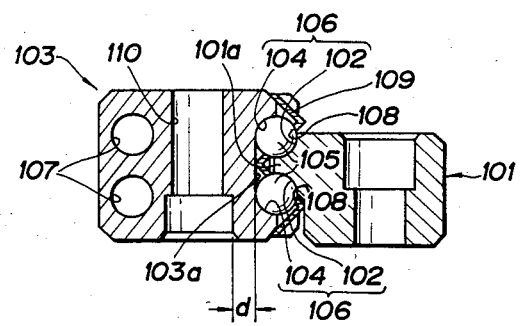
FIG. 26 is a cross-sectional view of a conventional bearing unit.

Referring next to FIGS. 24 and 25, there is shown a linear slide table unit employing the bearing unit 1 arranged as above. In the table unit, a fixed bed 40 is provided on its upper surface with two parallel positioning ridges 41, 41 extending in the longitudinal direction thereof. On the fixed bed 40 are further secured two track rails 2, 2 by means of bolts 42, 42 in a state wherein the respective side surfaces 2b, 2b thereof which are opposite to the side surfaces formed with the loaded ball rolling surfaces 5, 5 abut against the respective outer surfaces of the positioning projections 41, 41. The table unit further includes a movable table 43 which is disposed above the fixed bed 40. The movable table 43 has on both its sides skirt portions 43a, 43a projecting downwardly therefrom. Four bearing units 1 are secured to the lower surface of the movable table 43 on the respective inner sides of the skirt portions 43a, 43a by means of bolts 44, 44 . . . . The bearing units 1 are provided in pairs, each pair for one track rail, in such a manner that each pair of bearing units 1 are disposed at a proper spacing in the longitudinal direction of the associated track rail 2. In this case, each bearing unit 1 is disposed such that the loaded ball rolling surfaces 8, 8 of the bearing body 4 face the corresponding loaded ball rolling surfaces 5, 5 on the associated track rail 2. As will be clear from FIG. 24, the diameter of each of the bolts 42 for mounting the track rails 2 is made smaller than that of a smaller-diameter portion 19a of each of the mounting bores 19 of the track rails 2, 2, whereby a slight gap is formed between each bolt 42 and the smaller-diameter portion 19a of the associated mounting bore 19. Also, the diameter of each of the bolts 44 for mounting each of the bearing bodies 4 is made smaller than that of a smaller-diameter portion 45a of each of the mounting bores 45 formed in the movable table 43, whereby a slight gap is formed between each bolt 44 and the smaller-diameter portion 45a of the associated bore 45. Preload adjusting bolts 46, 46 . . . are screwed into one of the skirt portions 43a of the movable table 43 at proper spacings in the longitudinal direction of the movable table 43, the preload adjusting bolts 46, 46 . . . being employed to adjust the preload imposed on the loaded balls 3a, 3a . . . which are interposed between each bearing body 4 and the corresponding track rail 2. Thus, by tightening or untightening the preload adjusting bolts 46, 46 . . . , each bearing body 4 is moved inwardly or outwardly with respect to the movable table 43 within the range determined by the gap between the smaller-diameter portion 45a of each of the bores 45 for mounting the movable table 43 and the bolt 44 received thereby, whereby it is possible to properly adjust the preload imposed on the loaded balls 3a, 3a . . . interposed between the bearing body 4 and the track rail 43.

It is to be noted that the reference numeral 47 in FIGS. 24 and 25 denotes each of the locknuts which function to prevent the associated preload adjusting bolt 46 from being undesirably untightened.

The following is a description of the operation of the above-described linear slide table unit.

As the bearing bodies 4 advance together with the movable table 43, the loaded balls 3a, 3a . . . , which are held between the loaded ball rolling surfaces 5, 5 of each of the track rails 2 and the corresponding loaded ball rolling surfaces 8, 8 of the associated bearing body 4, roll while being guided by the ball guide surfaces 11a, 11a of the retainer 11 and are guided by the tongues 24, 24 formed on one of the end plates 7 such as to roll into the semi-annular communicating passages 31, 31 within the end plate 7 and then become non-loaded balls 3b, 3b . . . in the manner shown in FIGS. 4 to 6. As shown in FIG. 4, the non-loaded balls 3b, 3b . . . rolling through the communicating passages 31, 31 then pass through the non-loaded ball rolling passages 17, 17 of the bearing body 4 and the semi-annular communicating passages 31, 31 within the opposite end plate 7 and return into the loaded ball rolling passages 9, 9 thus becoming loaded balls 3a, 3a again. Thereafter, the balls 3, 3 . . . repeat their circulation in the same manner as the above.

Although the invention is applied to the endless slide ball bearing unit in the above description, the invention may be applied to other types of bearing unit in a manner similar to the above, for example, an endless slide roller bearing unit employing rollers as rolling elements.

According to the above-described embodiment, the loaded ball rolling surfaces 8, 8 are directly formed on one side surface of the bearing block 6, whereas, in the conventional bearing unit, the loaded ball rolling surfaces are formed on both sides of the recess which is formed on one side surface of the bearing block such as to extend in the longitudinal direction thereof. Therefore, even when the bearing block 6 has a relatively small cross-section, it is possible to obtain a relatively large distance D between the loaded ball rolling surfaces 8, 8 and the mounting bores 18 formed in the bearing block 6, that is, it is possible to increase the wall thickness of the portion of the bearing block 6 between the loaded ball rolling surfaces 8, 8 and the mounting bores 18. Accordingly, when the loaded ball rolling surfaces 8, 8 are subjected to a surface hardening treatment, such as high-frequency (induction) hardening, there is no fear that the loaded ball rolling surfaces 8, 8 may undesirably melt on heating at high temperature. It is, therefore, possible to provide a bearing unit having a reduced size. Further, since the loaded ball rolling surfaces 5, 5 on the side surface of the track rail 2 are formed within the recess 2a, it is difficult for external dust or other foreign matter to enter and adhere to the loaded ball rolling surfaces 5, 5, which fact enables the balls 3a, 3a . . . to smoothly roll on the loaded ball rolling surfaces 5, 5, thereby making it possible to ensure light movement of the bearing body 4 at all times. Further, even when it is necessary to correct a deformation, such as twisting, of the track rail 2 which has a relatively large length, it is possible to conduct a correcting operation relatively simply and efficiently, without the need to employ a special jig of complicated configuration, in such a manner that, for example, the flat surface of an ordinary correcting jig is disposed to abut against a flat outer peripheral surface of the track rail 2, though not the side surface formed with the recess 2a, and a pressing force is then applied to the track rail 2. Furthermore, since each of the angles of contact $\alpha$ and $\beta$ between the loaded balls 3a, 3a . . . and the loaded ball rolling surfaces 5, 5 and 8, 8 is set at about 45 degrees, it is possible to uniformly bear the load imposed on the bearing unit 1 in the rightward and leftward as well as upward and downward directions.

As has been described above, according to the present invention, the non-loaded rolling element rolling grooves are formed on the bearing body in the longitudinal direction thereof, and the covers are provided in such a manner as to cover the respective non-loaded rolling element rolling grooves, thereby forming the non-loaded rolling element rolling passages. Thus, it advantageously becomes unnecessary to conduct any troublesome and time consuming boring operation, which would require a disadvantageously large number of machining steps, such a boring operation being required for the conventional bearing unit in which the non-loaded rolling element rolling bores are formed in the solid bearing body over the entire longitudinal length thereof. Accordingly, it is possible to remarkably improve the operating efficiency and consequently to reduce the cost. According to the present invention, further, the length of the bearing body is not limited, whereas it is limited in the conventional bearing unit in which the bearing body is subjected to a boring operation over the entire length thereof. It is, therefore, possible to enlarge as desired the length of each of the loaded rolling element rolling surfaces formed on the bearing body and to increase as desired the load-bearing capacity of the bearing as a whole. Accordingly, it is possible to produce bearing units of various lengths in accordance with the magnitude of the loads which are to be born thereby. Further, it is necessary to form on the retainer only the guide surfaces for guiding the rolling motion of the rolling elements and preventing the dislocation of the rolling elements, and it is not necessary to form any slit in the retainer, whereas the conventional bearing unit involves the need to form slits in the retainer having a length corresponding to the length of each of the loaded rolling element rolling surfaces of the bearing body and which must consequently be formed separately from the formation of the retainer. Accordingly, it is possible to produce the retainer simply and easily in accordance with the various purposes for which the bearing unit is used to bear a load simply by cutting a single or integral material having guide surfaces previously formed thereon in accordance with the desired length of each of the loaded rolling element rolling surfaces. Thus, it is possible to further reduce the cost of manufacture.

What is claimed is:

1. A bearing unit comprising in combination:
   a track rail having longitudinally extending loaded grooves of a circular cross section;
   a bearing body of a substantially rectangular cross section provided at its one side with first longitudinally extending loaded grooves of a circular cross section in opposed relation to said track rail grooves, and at its other side with second longitudinally extending non-loaded grooves;
   a pair of end plates of substantially the same cross section as said bearing body and secured to the opposite ends of said bearing body, each end plate having at its inner surface communication grooves for connecting between the respective first loaded grooves and the corresponding second non-loaded grooves;
   rolling elements recirculating through said opposed loaded grooves in said track rail and said bearing body, said communication grooves in said end plates, and said non-loaded grooves in said bearing body;
   a flat retainer extending along the length of said bearing body and disposed between said bearing body and said track rail, said retainer having at its opposite sides a pair of longitudinally extending guide surfaces of a circular cross section for guiding said rolling elements rolling between the opposed loaded grooves in said bearing body and said track rail and preventing the dislocation of said rolling elements; and
   covers extending along the length of said bearing body and covering the respective non-loaded grooves in said bearing body, each cover being provided on its inner side with a rectilinear ball guide surface.

2. A bearing unit according to claim 1, wherein said retainer and said covers are respectively engaged at their opposite ends with the inner surfaces of said end plates.

3. A bearing unit according to claim 1, wherein said non-loading grooves in said bearing body are formed by cutting the corners of said bearing body.

4. A bearing unit according to claim 3, wherein each of said non-loaded grooves in said bearing body is of a substantially rectangular cross section.

5. A bearing unit according to claim 4, wherein each of said covers is of an L-shaped cross section.

6. A bearing unit according to claim 1, wherein said track rail is provided at its one side with a longitudinally extending recess of a U-shaped cross section having at its opposite sides said loaded grooves, and wherein said bearing body is provided at said one side with a longitudinal ridge projecting into said U-shaped recess on the opposite sides of which are formed said loaded grooves in said bearing body.

* * * * *